Dec. 4, 1956     I. V. ZOZULIN ET AL     2,773,206
MAGNETIC POSITIVE DRIVE COUPLINGS
Filed May 18, 1954
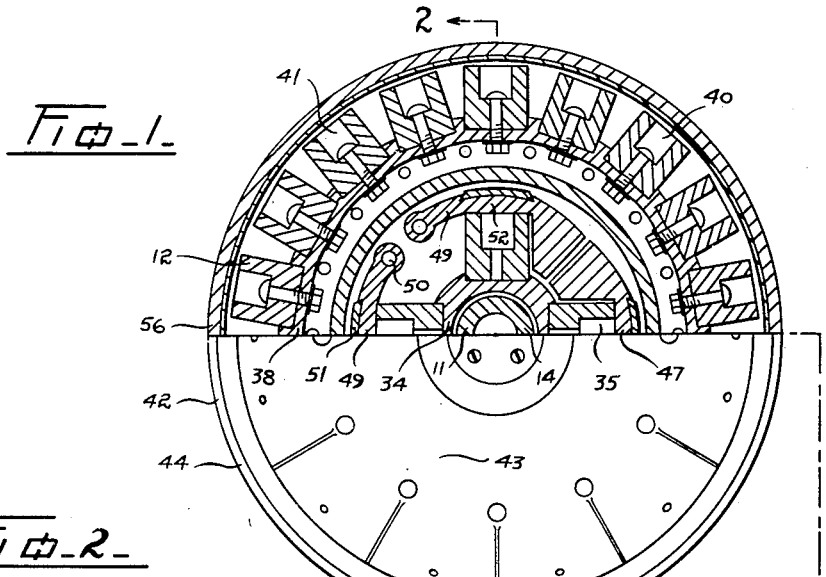
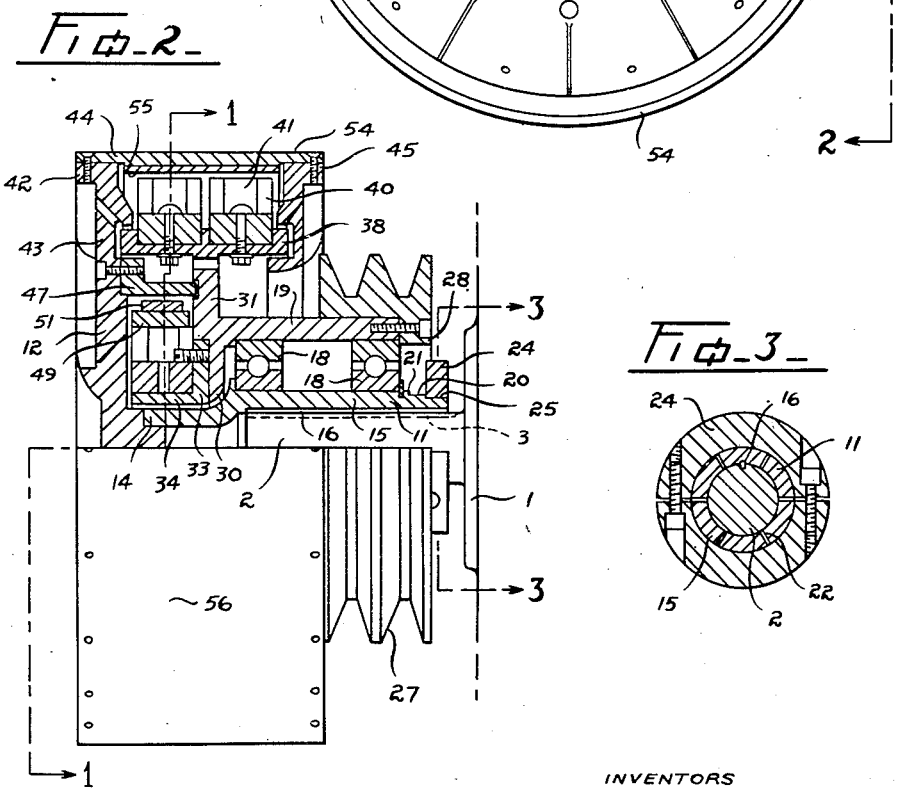
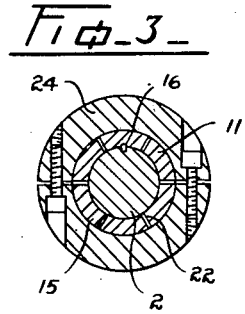
INVENTORS
IGOR V. ZOZULIN
GEORGE J. OKULITCH
GEORGE M. VOLKOFF
VLADIMIR J. OKULITCH
ALEC S. J. ELLETT
Ernest F Carver
ATTORNEY 0# United States Patent Office 2,773,206
Patented Dec. 4, 1956

2,773,206

MAGNETIC POSITIVE DRIVE COUPLINGS

Igor V. Zozulin, George J. Okulitch, George M. Volkoff, Vladimir J. Okulitch, and Alec S. J. Ellett, Vancouver, British Columbia, Canada, assignors, by mesne assignments, to Tormag Transmissions Limited, Vancouver, British Columbia, Canada Application May 18, 1954, Serial No. 430,963

3 Claims. (Cl. 310—100)

Our invention relates to improvements in magnetic positive drive couplings.

The present invention is adapted for mounting as a unit upon the end of a driven shaft and more particularly for mounting on the end of the shaft of an electric motor and is so designed that it is entirely carried by said shaft so that no outside bearings are necessary in the installation.

Amongst the objects of the invention is the provision of permanent magnets for the purpose of holding the centrifugal clutching shoes retracted from engagement whereby a very slight radial movement only is necessary between the clutch shoes and the clutch ring in changing from free running to engaging position, thus insuring instantaneous and simultaneous engagement of all shoes and avoiding any momentary unbalanced condition likely to create vibration.

A further object is to provide that alternate clutch shoes are mounted to be self-energizing and that the other shoes are mounted to be non-energizing.

Referring to the accompanying drawings:

Figure 1 is a longitudinal sectional view of the invention taken on the line 1—1 of Figure 2, part in elevation.

Figure 2 is a transverse sectional view taken on the line 2—2 of Figure 1, part in elevation.

Figure 3 is a sectional view of the hub sleeve retainer taken on the line 3—3 of Figure 1.

In the drawings like characters of reference indicate corresponding parts in each figure.

The numeral 1 indicates generally an electric motor having a drive shaft 2 which is provided with a keyway 3. Supported on the shaft 2 is a hub sleeve 11 of the coupling 12. This sleeve has an outer end portion 14 which is of lesser diameter than the inner portion 15 for purposes to be later described and the inner portion 15 is non-rotatably coupled to the shaft 2 by a key 16. The inner end portion of the hub sleeve is provided with spaced bearings 18 upon which an outer sleeve 19 is freely rotatable. The inner portion of the hub sleeve 11 is reduced as at 20 to provide a shoulder 21 and is split as at 22. The hub sleeve is held against endwise movement on the shaft 2 by a split retainer ring 24 seated in a groove 25 formed adjacent the inner end of the reduced portion 20, see Figures 2 and 3. The inner end of the outer sleeve 19 is fitted with a pulley 27 having an internal flange 28 which serves to hold the outer sleeve against endwise movement and engages an end of one of the bearings 18.

The outer end of the outer sleeve 19 is provided with an inner and an outer flange 30 and 31 respectively. The inner flange supports a flange member 33 having a cylindrical rim 34 upon which four permanent horseshoe magnets 35 are mounted radially. The outer flange 31 supports a drum 38 which extends on both sides of said flange and is fitted with two annular rows of magnets 40 which extend radially therefrom. The magnets 40 and the outer sleeve 19 form a driven rotor 41. The magnets 35 and 40 are entirely enclosed by a housing 42 which consists of the following parts: an end plate 43 which is secured to the free or reduced end 14 of the hub sleeve 11 and supports the entire housing, an enclosing rim 44 and an inner flange 45.

A clutch drum 47 is concentrically mounted on the inner face of the end plate 43 and two pairs of centrifugally actuated clutch shoes 49 are swingingly mounted on pins 50 carried by the flange 31. Each shoe is fitted at its outer end with a clutch lining 51 and the inner face of each shoe adjacent its free end forms an armature 52 for one of the magnets 35 to normally hold the clutch shoe out of contact with the clutch drum 47.

The enclosing rim 44 is of magnetically permeable material 54 and is lined on its inner periphery with a copper or other lamination 55 of high electrical conductivity to form a bimetallic rotor 56 which coacts with the rows of magnets 40 to form the magnetic clutch.

In operation, when the motor is at rest the clutch shoes 49 are retracted with their armatures 52 in contact with the pole pieces of the magnets 35. When the motor is started its shaft 2 imparts rotation through the sleeve 11 to the housing 42 and its bimetallic rotor 56, a magnetic torque is set up between said rotor and the outer sleeve 19 forming the driven rotor 41 to impart rotation thereto and to the driven pulley 27. As the slip decreases between the bimetallic rotor 56 and the driven rotor 41, the rotor 41 will approach its normal load speed. During this pick up period the centrifugal force being applied to the clutch shoes 49 will be straining away from the magnets 35, which obviously are of appropriate strength for the work and when the predetermined speed of the driven member is attained the clutch shoes break away from the magnets to bring their clutch lining 51 into holding contact with the clutch drum 47. As soon as the centrifugal clutch takes full charge of the load, no driving flux passes between the magnets 38 and the bimetallic rotor 56, consequently the heat generated by said flux becomes dissipated and the drive is entirely imparted by the shaft 2 to the driven pulley 27 by the centrifugal or mechanical clutch.

What we claim as our invention is:

1. A magnetic positive drive coupling comprising a hub sleeve having an outer end portion adapted for connection to a drive shaft and an outer sleeve concentric therewith having one end forming a power take off, said outer sleeve supporting at its outer end a housing, said housing having an outer rim forming a bimetallic rotor and a clutch drum, said outer sleeve having an annular row of magnets mounted in driving opposition to the bimetallic rotor, a plurality of clutch shoes movable to engage the inner periphery of the clutch drum and other magnets adapted to hold the clutch shoes retracted from engagement with the clutch drum until the slip between the bimetallic rotor and its magnets is reduced to a predetermined magnitude, said last named magnets being carried by the outer sleeve to rotate in unison with the annular row of magnets.

2. A magnetic positive drive coupling comprising a hub sleeve having an outer end portion adapted for connection to a drive shaft and an outer sleeve concentric therewith having one end forming a power take off, said outer hub sleeve supporting at its outer end a housing, said housing having an outer rim forming a bimetallic rotor and a clutch drum, said outer sleeve having an annular row of magnets mounted in driving opposition to the bimetallic rotor, a plurality of clutch shoes pivotally mounted from an outer sleeve part adapted to engage the inner periphery of the clutch drum and permanent magnets carried by said sleeve part adapted to retract the clutch shoes from the clutch drum when rotation of said outer sleeve drops below a predetermined speed.

3. A magnetic positive drive coupling comprising a hub sleeve adapted for attachment to a drive shaft, a housing secured to an end of the hub sleeve, said housing having a peripheral enclosing ring consisting of a band of metal of magnetically permeable material lined on its inner periphery with a band of high electrical conductivity, said bands forming a bimetallic rotor and a concentrically mounted clutch drum therein, a driven outer sleeve concentric with the hub sleeve, said outer sleeve supporting an annular row of magnets to form a drive rotor in opposition to the bimetallic rotor, a plurality of pivotally mounted clutch shoes carried by the outer sleeve and magnetic means carried by the outer sleeve adapted to hold the clutch shoes out of engagement with the clutch drum until said hub sleeve attains a predetermined speed.

References Cited in the file of this patent

UNITED STATES PATENTS

| | | |
|---|---|---|
| 1,126,061 | Morrison | Jan. 26, 1915 |
| 1,601,001 | Sleeper | Sept. 28, 1926 |
| 2,643,871 | Warrick | June 30, 1953 |
| 2,677,539 | Winslow | May 4, 1954 |